United States Patent [19]

Thomson et al.

[11] Patent Number: 5,750,689
[45] Date of Patent: *May 12, 1998

[54] TRIPHENDIOXAZINE COMPOUNDS

[75] Inventors: Gordon Alexander Thomson, Bolton; Duncan Adrian Sidney Phillips, Bury, both of United Kingdom

[73] Assignee: Zeneca Limited, London, England

[*] Notice: The term of this patent shall not extend beyond the expiration date of Pat. No. 5,498,712.

[21] Appl. No.: 640,822

[22] PCT Filed: Oct. 26, 1994

[86] PCT No.: PCT/GB94/02348

§ 371 Date: May 8, 1996

§ 102(e) Date: May 8, 1996

[87] PCT Pub. No.: WO95/14060

PCT Pub. Date: May 26, 1995

[51] Int. Cl.⁶ ............................................ C07D 265/38
[52] U.S. Cl. .................... 544/75; 544/76; 8/543; 8/549
[58] Field of Search .................................... 544/75, 76

[56] References Cited

U.S. PATENT DOCUMENTS

| | | | |
|---|---|---|---|
| 4,472,575 | 9/1984 | Renfrew | 544/76 |
| 4,785,098 | 11/1988 | Fuchs et al. | 544/76 |
| 5,498,712 | 3/1996 | Thomson | 544/76 |

FOREIGN PATENT DOCUMENTS

| | | |
|---|---|---|
| 84 718 | 8/1983 | European Pat. Off. |
| 142 777 | 5/1985 | European Pat. Off. |
| 176 196 | 4/1986 | European Pat. Off. |
| 576 123 | 12/1993 | European Pat. Off. |

*Primary Examiner*—Richard L. Raymond
*Attorney, Agent, or Firm*—Pillsbury Madison & Sutro LLP

[57] ABSTRACT

A compound of Formula (1) and salts thereof:

$$Z-X-B-X\underset{(SO_3H)_b}{\overset{(R)_n}{\longrightarrow}}\underset{A}{\overset{W}{\underset{N}{\bigcirc}}}\underset{(SO_3H)_c}{\overset{(R)_n}{\longrightarrow}}X-B-X-Z \quad (1)$$

wherein:
W is Cl or Br;
A is optionally substituted alkyl;
each R independently is halogen, alkyl, alkoxy or carboxy;
n is 0 or 1;
a+b is 0 to 4;
each X independently is O, S or $NR^1$ wherein $R^1$ is H or optionally substituted alkyl;
B is a divalent organic linker group; and
Z is an aromatic nitrogen ring heterocycle devoid of cellulose-reactive groups.

10 Claims, No Drawings

TRIPHENDIOXAZINE COMPOUNDS

This application is a 371 of PCT/GB94/02348, filed Oct. 26, 1994.

This invention relates to organic chemicals, and in particular to triphenodioxazine dyes which are free from cellulose-reactive groups, their preparation and uses.

According to the present invention there is provided a compound of Formula (1) and salts thereof:

$$Z-X-B-X-\underset{(SO_3H)_b}{\overset{(R)_n}{\diagup}}\overset{W}{\underset{A}{\diagdown}}\overset{(R)_n}{\diagup}X-B-X-Z \quad (1)$$

wherein:

W is Cl or Br;

A is optionally substituted alkyl;

each R independently is halogen, alkyl, alkoxy or carboxy;

n is 0 or 1;

a+b is 0 to 4;

each X independently is O, S or $NR^1$ wherein $R^1$ is H or optionally substituted alkyl;

B is a divalent organic linker group; and

Z is an aromatic nitrogen ring heterocycle devoid of cellulose-reactive groups.

A is preferably methyl or, more preferably, a group of the Formula (2):

$$\underset{R^2}{\overset{-CH-R^3}{|}} \quad (2)$$

wherein:

$R^2$ is H, OH or $CH_3$; and $R^3$ is $C_{1-3}$-alkyl, hydroxy-$C_{1-3}$-alkyl or $-CH_2O-(C_{1-4}$-alkyl).

Preferably $R^2$ is H or methyl, especially H. $R^3$ is preferably $C_{1-3}$-alkyl, especially methyl. In a preferred embodiment $R^2$ is H and $R^3$ is methyl.

As Examples of groups of Formula (2) there may be mentioned $-CH_2CH_3$, $-CH_2CH_2CH_3$, $-(CH_2)_3-CH_3$, $-CH_2CH(CH_3)_2$, $-CH(CH_3)_2$, $-CH_2CH_2-O-CH_3$, $-CH_2CH_2-OCH_2CH_3$, $-CH(OH)CH_3$ and $-CH_2CH_2OH$, the latter two exemplifying hydroxy-$C_{1-3}$-alkyl groups.

When R is alkyl it is preferably $C_{1-4}$-alkyl, especially methyl or ethyl. When R is alkoxy it is preferably $C_{1-4}$-alkoxy, especially methoxy. $R^1$ is preferably H or $C_{1-4}$-alkyl.

The groups represented by Z—X—B—X— in Formula (1) may be the same as each other or different from one another.

n is preferably 0.

a+b is preferably 2.

a and b are preferably 1.

Each X independently is preferably $NR^1$ as hereinbefore defined, especially NH or $N(CH_3)$.

The divalent organic linking group represented by B is preferably alkylene, especially $C_{1-6}$-alkylene, more especially $C_{2-4}$-alkylene; aralkylene, preferably $C_{7-11}$-aralkylene, especially phenyl-$C_{1-4}$alkylene; or arylene, preferably arylene having up to six carbon atoms, especially phenylene; and B may be substituted or unsubstituted.

As examples of alkylene and aralkylene radicals represented by B, there may be mentioned:

1,2- and 1,3-propylene (i.e. $-CH_2CH(-)CH_3$ and $-(CH_2)_3-$)
1,2-ethylene (i.e. $-CH_2CH_2-$)
2-hydroxy-1,3-propylene
1- and 2-phenyl-1,3-propylene
2-(4'-sulphophenyl)-1,3-propylene
1,4-, 2,3- and 2,4-butylene
2-methyl-1,3-propylene
2-methyl-2,4-pentylene
2,2-dimethyl-1,3-propylene
1-phenylethylene
1-chloro-2,3-propylene
1,6- and 2,5-hexylene
2,3-diphenyl-1,4-butylene
1-(methoxycarbonyl)-1,5-pentylene
1-carboxy-1,5-pentylene
2,7-heptylene
3-methyl-1,6-hexylene
$-CH_2CH_2OCH_2CH_2-$
$-CH_2CH_2SCH_2CH_2-$
$-CH_2CH_2SSCH_2CH_2-$ $-CH_2CH_2-N\underset{\diagdown\_\diagup}{\overset{\diagup\overline{\phantom{x}}\diagdown}{\phantom{x}}}N-CH_2CH_2-$, $-CH_2-\underset{\diagdown}{\overset{\diagup\phantom{x}\diagdown}{\phantom{x}}}-CH_2-$ $-CH_2-\text{(phenyl with }CH_2-\text{ meta)}$, $-CH_2-\text{(phenyl with }CH_2-\text{ para)}$ $-CH_2CO-\text{(phenyl)}-CO-CH_2-$, $-CH_2-\text{(naphthyl)}-CH_2-$ As examples of arylene radicals represented by B there may be mentioned 1,2-, 1,3- and 1,4-phenylene and 1,4-naphthylene which optionally are sulphonated.

Suitable aromatic nitrogen ring heterocycles (Z) devoid of cellulose-reactive groups include quinoxaline, pyrimidine, pyridine and especially triazine groups. The group Z may be unsubstituted, but preferably contains one or more non-labile substituents.

A particularly preferred group represented by Z is of Formula (3):

$$\underset{N}{\overset{Y^1}{\diagdown}}\underset{\diagdown N\diagup}{\overset{\diagup N}{\phantom{x}}}\underset{Y^2}{\overset{\diagdown}{\phantom{x}}} \quad (3)$$

wherein $Y^1$ and $Y^2$ are each independently hydrogen or a non-labile substituent. $Y^1$ and $Y^2$ are the same or different. $Y^1$ and $Y^2$ are preferably each independently OH, $NH_2$, $C_{1-4}$-alkyl, H or optionally substituted alkylamino including dialkylamino and cycloaliphatic amino), arylamino, alkylthio, arylthio, alkoxy or aryloxy.

In one embodiment $Y^1$ and $Y^2$ are each independently an optionally substituted arylamino group.

In a second embodiment one of $Y^1$ and $Y^2$ is optionally substituted arylamino and that the other is a non-aryl group, especially OH, $NH_2$ or optionally substituted alkylamino, alkylthio or alkoxy.

When $Y^1$ or $Y^2$ is an optionally substituted alkylamino group it is preferably of the formula $-NR^4R^5$ wherein $R^4$ is optionally substituted alkyl (especially optionally substituted $C_{1-4}$-alkyl), $R^5$ is H or an optionally substituted alkyl group, or $R^4$ and $R^5$ taken together with the N atom to which they are attached form a 5- or 6-membered ring, especially a morphilino or piperidino ring. Examples of such groups include $C_{1-4}$-alkylamino, e.g. methylamino, ethylamino, butylamino; di($C_{1-4}$-alkyl)amino, e.g. dimethylamino, diethylamino, methylamino; and $C_{1-4}$-alkylamino and di($C_{1-4}$-alkyl)amino groups having an OH, CN or $SO_3H$ group, such as β-hydroxyethylamino, di(β-hydroxyethyl)amino, β-cyanoethylamino, β-sulphoethylamino, β-hydroxypropylamino and (β-hydroxethyl)methylamino.

When $Y^1$ or $Y^2$ is an arylamino group it is preferably of the formula $-NR^5R^6$ wherein $R^5$ is as hereinbefore defined and $R^6$ is optionally substituted naphthyl or phenyl.

When $Y^1$ or $Y^2$ is alkylthio or arylthio it is preferably of the formula $-S-R^7$ or $-S-R^8$ respectively wherein $R^7$ is optionally substituted alkyl (especially optionally substituted $C_{1-4}$-alkyl) and $R^8$ is optionally substituted phenyl. Examples of such groups include $-SCH_3$, $-SCH_2CH_3$, phenylthio and sulphophenylthio.

When $Y^1$ or $Y^2$ is alkoxy or aryloxy it is preferably of the formula $-O-R^7$ or $-O-R^8$ wherein $R^7$ and $R^8$ are as hereinbefore defined. Examples of such groups include methoxy, ethoxy, n-propoxy and isopropoxy; alkoxyalkoxy groups such as β-methoxyethoxy and β-ethoxyethoxy; sulphophenoxy and phenoxy.

When $Y^1$, $Y^2$, $R^4$, $R^5$, $R^6$, $R^7$ or $R^8$ is substituted the substituent is preferably selected from hydroxy, sulpho, carboxy, $C_{1-4}$-alkyl, cyano, Cl, Br, $NO_2$, acetamido or $C_{1-4}$-alkoxy unless stated otherwise above.

An especially preferred group Z is of the formula:

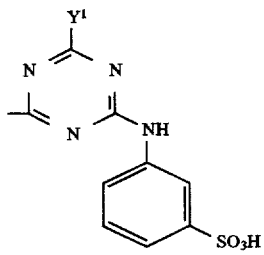

wherein $Y^1$ is $NH_2$ or an optionally substituted arylamino or alkylamino group as hereinbefore described.

A preferred group represented by $-NR^5R^6$ is of the formula:

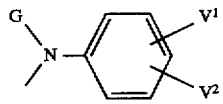

wherein G is H; $C_{1-4}$-alkyl, especially methyl or ethyl; substituted $C_{1-4}$-alkyl, especially sulphomethyl and β-carboxy-, β-hydroxy- or β-cyanoethyl; and $V^1$ and $V^2$ are each independently selected from H, carboxy, sulpho, $CH_3$, $C_2H_5$, $OCH_3$, $OC_2H_5$, Cl, Br, CN, $NO_2$ and $NHCOCH_3$. Preferably $V^1$ is sulpho.

The invention further provides a process for the manufacture of dyestuffs of Formula (1) which comprises reacting the corresponding dyebase (i.e. a compound of Formula (1) wherein both groups Z now represent hydrogen and the other groups have the meanings given above) with an aromatic nitrogen ring heterocycle which contains at least one labile halogen atom attached to a carbon atom of the heterocyclic nucleus, followed by the subsequent conversion of any residual labile groups to non-labile groups.

Thus the aromatic nitrogen ring heterocycle may possess a single halo group and the desired non-labile groups, in which case the dyestuff of the present invention is manufactured directly. Preferably, however, the aromatic nitrogen ring heterocycle possesses two or three halide groups so that the first stage of the manufacture is acylation of the dyebase by the aromatic nitrogen ring heterocycle followed by subsequent conversion of the remaining one or two halide groups to the desired non-labile groups.

For example, if the group Z in the dyestuff is the triazine group of Formula (3) having non-labile substituents $Y^1$ and $Y^2$, the dyestuff may be prepared by reaction of the dyebase with cyanuric chloride followed by reaction of the first remaining chloride group with the appropriate nucleophile $Y^1$—H (i.e. the appropriate amine, alcohol, thiol, etc or water or ammonia) to form the group $Y^1$ under relatively mild conditions, followed in turn by the reaction of the second remaining chloride group under more forcing conditions with the appropriate nucleophile to form the group $Y^2$. Preferably, however, the dyestuff is prepared by reaction with a triazine derivative from cyanuric chloride in which one of the chloride atoms has been replaced by the appropriate group $Y^1$. The one remaining halogen atom in the product is then replaced by reaction with the appropriate nucleophile to form the substituent $Y^2$.

Reaction of the dyebase with the aromatic nitrogen ring heterocycle can conveniently be carried out by stirring a mixture of the reactants in an aqueous medium at a suitable temperature, which may be, for example, from 0° C. to 60° C. Subsequent reaction of remaining halogen atom(s) with the appropriate nucleophile(s) will in generally take place under more forcing conditions, for example at a temperature of from 30° C. to 100° C. It is generally preferred to add an acid-binding agent during the course of the reaction to maintain the pH within the limits 8 to 11.

The dyebase (the compound of Formula (1) wherein both symbols Z now represent hydrogen and the other symbols have the meanings given above) may be prepared by methods analogous to those described in the art, for example in copending European patent application No 93303238.5 or EP 356,014 and EP 482,789.

The compounds may be isolated from the reaction medium by conventional means, for example salting out followed by filtration and drying, for example by spray-drying the reaction mixture. If desired, stabilisers such as alkali metal hydrogen phosphates or diluents such as sodium chloride or urea may be added.

The dyes of the present invention are water-soluble dyes useful for the coloration of polyamides and cellulosic materials, especially cotton and paper, on which they give attractive bright blue shades. Because of their high tinctorial strength the amount of dyestuff used to achieve quite deep shades is small, resulting in relatively economic dyeing. The light fastness and fastness to food solvents such as milk and cooking oil of the dyed paper is excellent. The presence of the alkyl group A in Formula (1) leads to good build up, particularly when A is of Formula (2).

The invention is illustrated by the following Examples in which all parts and percentages are by weight unless otherwise stated. The term "MI" indicates the weight of the material containing the molecular weight of pure compound.

EXAMPLE 1

Preparation of

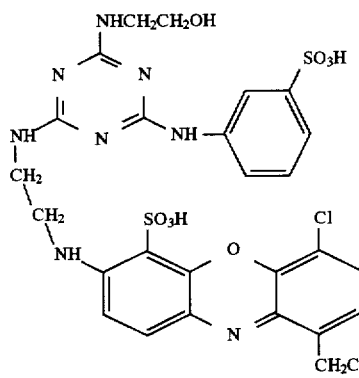 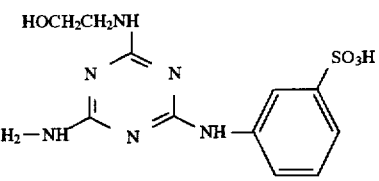

Stage a)—Preparation of trichloroethyl-p-benzoquinone 2-ethylaniline (60.5 g) in 60% $H_2SO_4$ (600 ml) was heated to 100° C. Chlorine gas was bubbled into the solution until there was no further uptake and a solid had precipitated. The reaction mixture was drowned onto ice (3 kg) and the precipitated solid collected. Crystallisation from ethanol gave trichloroethyl-p-benzoquinone (35 g) m.p. 115° C.

Stage b)—Preparation of Dianilide

Trichloroethyl-p-benzoquinone (15 g) and 2-(2-aminoethylamino)-5-aminobenzene sulphonic acid (2.1 molecular equivalents) were stirred together in water (500 ml) at 50° C. and pH 6. A few drops of calsolene oil were added. The pH was maintained between 5–6 by addition of $Na_2CO_3$ solution. After 5 hours at 50° C. the mixture was cooled and a brown/black precipitate of dianilide collected (37 g).

Stage c)—Ring Closure of Dianilinide to give an acylatable dyebase

Dianilide (37 g) was dissolved in 5% oleum (400 mls) and ammonium persulphate (2 molecular equivalents) added. After 3 hours at room temperature the oleum solution was drowned onto ice (1.5 kg). Acetone (1.51) was then added and the reddish-blue solid dyebase collected by filtration (12 g). λmax ($H_2O$) 606 nm.

Stage d)—Acylation of dyebase

Dyebase prepared as described in Stage c) (on a larger scale) (37.5 g) was stirred in water (450 ml) at pH 9.5 and 45° C. A solution of the condensation product between metanilic acid (31.1 g) and cyanuric chloride (33.0 g) in water (660 ml) was added dropwise to the dyebase. The temperature was maintained between 45°–50° C. and the pH kept between 8.5–9.0 by the addition of 2N NaOH. The addition of the condensation product took place over 1 hour and after a further 3 hours at 45° C. the mixture was allowed to cool overnight. Sodium chloride to 20% w/v was added to precipitate bis-monochlorotriazine dye which was collected by filtration (173 g, 38% strength by CHN analysis).

Stage e —Preparation of title product

The product from Step d (39.5 g) and ethanolamine (15.2 g) were heated in water (700 ml) at 65°–70° C. for 2 hours after which time thin layer chromatography indicated that the reaction was complete. Addition of NaCl to 10% w/v precipitated the title product as a blue solid and this was collected by filtration (19.5 g, 57% strength).

The title product was applied to cotton by exhaust dyeing and was found not to stain polyamide in wash-fastness tests.

EXAMPLE 2

The method of Example 1 was repeated except that in place of ethanolamine there was used diethanolamine.

The resultant product was applied to polyamide by exhaust dyeing and was found to have very good build-up properties and wash-fastness.

EXAMPLE 3

Preparation of

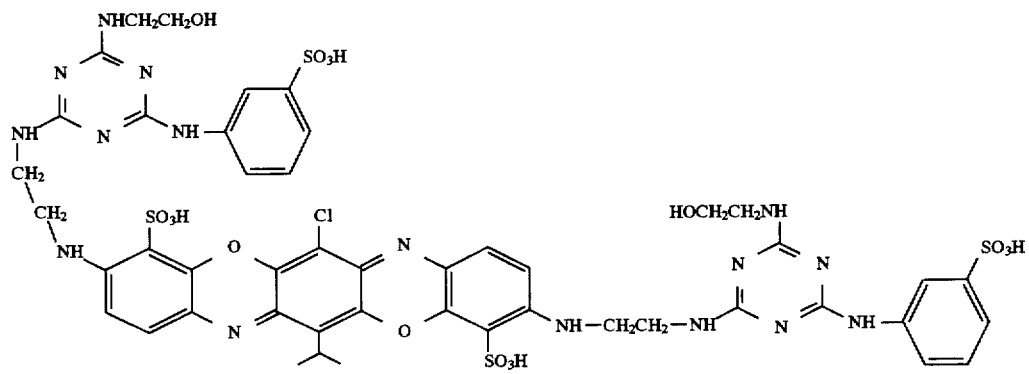

Stage a)

2-isopropylaniline (100 g) in 70% $H_2SO_4$ (1200 ml) was heated to 70° C. Chlorine gas was bubbled into the solution until there was no further uptake and a solid had precipitated. The reaction mixture was drowned onto ice (2 kg) to precipitate isopropyltrichloro-p-benzoquinone as a reddish-brown solid (94 g). (Analysis: C42.4%; H3.2%; Cl 41.1%. $C_9H_7Cl_3O_2$ requires C42.6%; H2.8%; Cl42.0%).

Stage b)

Isopropyltrichloro-p-benzoquinone (20 g) and 2-(2'-aminoethylamino)-5-aminobenzene sulphonic acid (2.1 molar equivalents) were stirred together in water (500 ml) at 80° C. and pH 6. A few drops of calsolene oil were added. The pH was maintained between 5–6 by addition of $Na_2CO_3$ solution. After 12 hours at 80° C. the mixture was cooled and a brown precipitate of dianilide collected (25 g).

Stage c)

The product from stage b) (15 g) was dissolved in 10% oleum (165 ml) and potassium sulphate (2 molar equivalents) added. After 4 hours at room temperature the oleum solution was drowned into ice (2.5 kg) to give a reddish-blue solid dyebase which was collected by filtration (4 g).

Stage d)

The method of Example 1, stages d) and e) may be repeated except that in place of the product from Example 1, stage c), there is used the product from Example 3, Stage c).

EXAMPLE 4

Preparation of

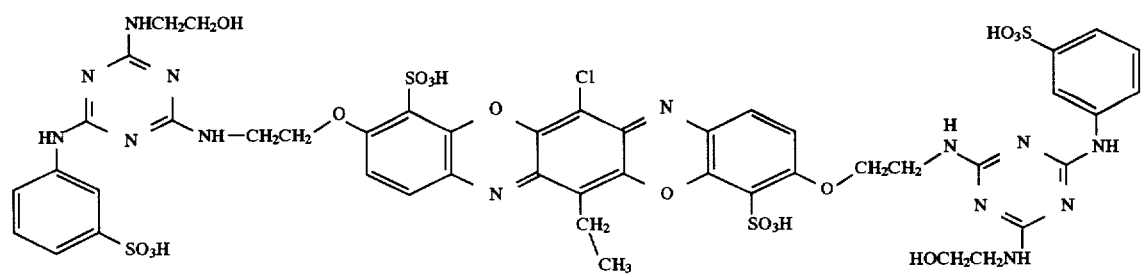

Stage a)

Ethyltrichloro-p-benzoquinone (5.6 g) and and 2-(2'-aminoethoxy)-5-aminobenzene sulphonic acid (2.1 mole equivalents) were stirred together in water (100 ml) at 80° C. and pH 6.5. A few drops of calsolene oil were added. The pH was maintained at 6–7 by addition of $Na_2CO_3$ solution. After 4 hours at 80° C. the mixture was cooled and a brown precipitate of dianilide collected (7.8 g).

Stage b)

The product from Stage a) (7.8 g) was dissolved in 20% oleum (50 ml) and potassium persulphate (2 mole equivalents) were added. After 1½ hours at 30° C. the oleum solution was drowned onto ice (500 g) and a purple solid dyebase collected by filtration (4.3 g).

Stage c) Acylation of dyebase

The method of Example 1, Stages d) and e), may be repeated except that in place of the product from Example 1, Stage c), there is used the product from Example 4, Stage b).

EXAMPLE 5

Preparation of

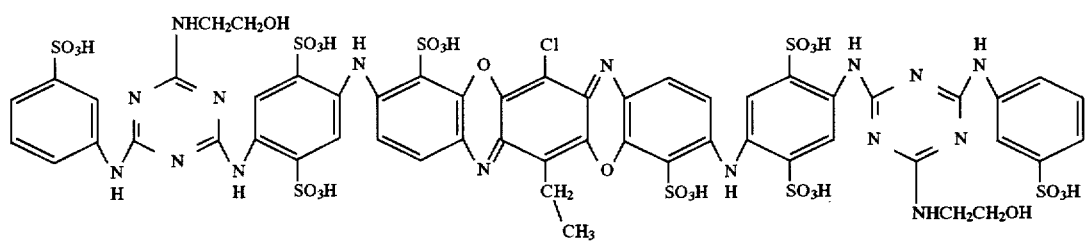

Stage a)

Ethyltrichloro-p-benzoquinone (3.6 g) and 4,4'-diaminodiphenylamine-2,2',5-trisulphonic acid (2.1 mole equivalents) were stirred together in water (110 ml) at 50° C. and pH 6. A few drops of calsolene oil were added. The pH was maintained between 5.5 and 6 by addition of a $Na_2CO_3$ solution. After 4 hours at 50° C. the mixture was cooled, screened and saturated with salt. A dark brown precipitate of dianilide was collected (18.8 g)

Stage b)

The product from Stage a) (18.6 g) was dissolved in 98% $H_2SO_4$ and manganese dioxide (7 g) added. After 1 hour at room temperature the solution was drowned onto ice (1.2 kg). KCl solution (to approximately 25% w/v) was added and the pH adjusted to pH 11. The precipitated dyebase was collected by filtration and redissolved in cold water (1000 ml). The solution was adjusted to pH7 and cyanuric chloride (2.8 g) added. A few drops of calsolene oil were added. The pH was maintained between 6.5–7 by addition of $Na_2CO_3$ solution. After 4 hours at 5° C. the blue solution was reduced in volume, dialysed and evaporated to a blue powder (42.8 g, 11% strength).

Stage c) Acylation of dyebase

The product from Example 5, Stage b) may be reacted sequentially with metanilic acid and ethanolamine to give the title product.

EXAMPLE 6

The method of Example 1 was repeated except that in place of ethanolamine there was used morpholine.

The resultant dye was applied to cotton by exhaust dyeing and was found to have good dyeing properties, the depth of shade obtained for a given concentration of dye remaining constant even when the temperature was varied.

EXAMPLES 7 TO 14

The method of Example 1 may be repeated except that in place of metanilic acid there is used the amine listed below:

| Example | Amine |
| --- | --- |
| 7 | orthanilic acid |
| 8 | ammonia |
| 9 | aniline-2,4-disulphonic acid |
| 10 | aniline-2,5-disulphonic acid |
| 11 | 4-acetamido orthanilic acid |
| 12 | sulphanilic acid |
| 13 | 2-methyl sulphanilic acid |
| 14 | 4-methyl orthanilic acid |

EXAMPLES 15 TO 21

The method of Example 1 may be repeated except that in place of ethanolamine there is used the amine listed below:

| Example | Amine |
| --- | --- |
| 15 | ammonia |
| 16 | aniline |
| 17 | ethylamine |
| 18 | 3-methoxypropylamine |
| 19 | sulphanilic acid |
| 20 | metanilic acid |
| 21 | orthanilic acid |

EXAMPLE 22

The method of Example 1 may be repeated except that instead of adding ethanolamine the pH is raised to pH 11 to give a product of the formula shown in Example 1 except that in place of the two —NHCH$_2$CH$_2$OH groups there are two —OH groups.

We claim:

1. A compound of Formula (1) and salts thereof:

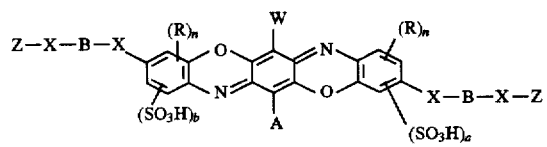
(1)

wherein:

W is Cl or Br;

A is optionally substituted alkyl;

each R independently is halogen, alkyl, alkoxy or carboxy;

n is 0 or 1;

a+b is 0 to 4;

each X independently is O, S or NR$^1$ wherein R$^1$ is H or optionally substituted alkyl;

B is a divalent organic linker group; and

Z is an aromatic nitrogen ring heterocycle devoid of cellulose-reactive groups.

2. A compound according to claim 1 wherein A is a group of the Formula (2):

(2)

wherein:

R$^2$ is H, OH or CH$_3$; and

R$^3$ is C$_{1-3}$-alkyl, hydroxy-C$_3$-alkyl or —CH$_2$O—(C$_{1-4}$-alkyl).

3. A compound according to claim 1 wherein A is —CH$_2$CH$_3$, —CH$_2$CH$_2$CH$_3$, —(CH$_2$)$_3$CH$_3$, —CH$_2$CH(CH$_3$)$_2$, —CH(CH$_3$)$_2$, —CH$_2$CH$_2$OCH$_3$, —CH$_2$CH$_2$OCH$_2$CH$_3$, —CH(OH)CH$_3$ or —CH$_2$CH$_2$OH.

4. A compound according to any one of the preceding claims wherein each X independently is NR$^1$ wherein R$^1$ is H or C$_{1-4}$-alkyl.

5. A compound according to claim 1 or 2 wherein B is C$_{1-6}$-alkylene, C$_{7-11}$-aralkylene or arylene having up to six carbon atoms.

6. A compound according to claim 1 or 2 wherein B is —CH$_2$CH$_2$— or —(CH$_2$)$_3$—.

7. A compound according to claim 1 or 2 wherein each Z independently is of the formula:

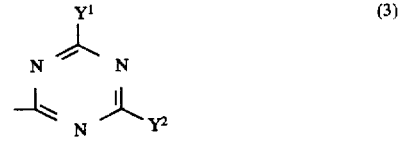
(3)

wherein Y$^1$ and Y$^2$ are each independently H or a non-labile substituent.

8. A compound according to claim 7 wherein one of Y$^1$ and Y$^2$ is an optionally substituted arylamino group and the other is OH, NH$_2$ or optionally substituted alkylamino, alkylkthio or alkoxy.

9. A compound according to claim 1 or 2 wherein n is 0, a and b are 1, each X independently is NR$^1$, R$^1$ is H or C$_{2-4}$-alkyl, B is 1,2- or 1,3-propylene or 1,2-ethylene and Z is of the formula

(2)

wherein Y$^1$ and Y$^2$ are each independently H or a non-labile substituent.

10. A method of coloring cotton or paper which comprises applying thereto a dye according to claim 1.

* * * * *